(12) United States Patent  (10) Patent No.: US 7,941,374 B2
Orttung et al.  (45) Date of Patent: May 10, 2011

(54) SYSTEM AND METHOD FOR CHANGING A PERSONAL PROFILE OR CONTEXT DURING A TRANSACTION

(75) Inventors: Mark Orttung, Menlo Park, CA (US); Matthew Mihic, San Francisco, CA (US); William Charles Mortimore, Jr., San Francisco, CA (US); Sean Handel, Moss Beach, CA (US)

(73) Assignee: Rearden Commerce, Inc., Foster City, CA (US)

( * ) Notice: Subject to any disclaimer, the term of this patent is extended or adjusted under 35 U.S.C. 154(b) by 259 days.

(21) Appl. No.: 11/478,798

(22) Filed: Jun. 30, 2006

(65) Prior Publication Data

US 2008/0004921 A1    Jan. 3, 2008

(51) Int. Cl.
*G06Q 40/00* (2006.01)
*G06Q 10/00* (2006.01)

(52) U.S. Cl. .............................. 705/40; 705/5
(58) Field of Classification Search .............. 705/35–42, 705/5
See application file for complete search history.

(56) References Cited

U.S. PATENT DOCUMENTS

| | | | |
|---|---|---|---|
| 4,812,843 A | 3/1989 | Champion et al. | |
| 4,969,136 A | 11/1990 | Chamberlin et al. | |
| 5,021,953 A * | 6/1991 | Webber et al. | 705/6 |
| 5,289,531 A | 2/1994 | Levine | |
| 5,459,859 A | 10/1995 | Senda | |
| 5,513,126 A | 4/1996 | Harkins et al. | |
| 5,623,404 A | 4/1997 | Collins et al. | |
| 5,655,081 A | 8/1997 | Bonnell et al. | |
| 5,765,140 A | 6/1998 | Knudson | |
| 5,790,974 A | 8/1998 | Tognazzini | |
| 5,802,492 A | 9/1998 | DeLorme et al. | |
| 5,812,844 A | 9/1998 | Jones et al. | |
| 5,832,451 A * | 11/1998 | Flake et al. | 705/5 |
| 5,875,436 A | 2/1999 | Kikinis | |
| 5,892,909 A | 4/1999 | Grasso et al. | |
| 5,940,803 A * | 8/1999 | Kanemitsu | 705/6 |
| 5,966,658 A | 10/1999 | Kennedy et al. | |
| 6,009,408 A | 12/1999 | Buchanan | |
| 6,091,956 A | 7/2000 | Hollenberg | |
| 6,094,681 A | 7/2000 | Shaffer et al. | |
| 6,104,788 A | 8/2000 | Shaffer et al. | |

(Continued)

OTHER PUBLICATIONS

"Leisure activities are increasingly being fitted in to help make life on the road less of a grind", The New York Times, Joe Sharkey, New York, N.Y.: Apr. 18, 2001. p. C.6.*

(Continued)

*Primary Examiner* — Daniel S. Felton
*Assistant Examiner* — Mohammad Z Shaikh
(74) *Attorney, Agent, or Firm* — Greenberg Traurig, LLP (57) ABSTRACT

A method for changing a personal profile or context during a transaction, is described. In one embodiment, the method is to be implemented on a system. In one embodiment the method comprises receiving travel selections for a first leg of an itinerary; receiving an assignment of the travel selections for the first leg to a first profile; receiving travel selections for a second leg of the itinerary; receiving an assignment of the travel selections for the second leg to a second profile; and billing for the first and second legs of the itinerary as a single multi-leg travel itinerary, and billing the first leg of the itinerary to the first profile and billing the second leg of the itinerary to the second profile.

15 Claims, 4 Drawing Sheets

U.S. PATENT DOCUMENTS

| | | | |
|---|---|---|---|
| 6,157,945 A | 12/2000 | Balma et al. | |
| 6,249,252 B1 | 6/2001 | Dupray | |
| 6,253,369 B1 | 6/2001 | Cloud et al. | |
| 6,292,830 B1 | 9/2001 | Taylor et al. | |
| 6,317,686 B1 | 11/2001 | Ran | |
| 6,336,072 B1 | 1/2002 | Takayama et al. | |
| 6,360,205 B1 * | 3/2002 | Iyengar et al. | 705/5 |
| 6,370,566 B2 | 4/2002 | Discolo et al. | |
| 6,381,578 B1 | 4/2002 | DeMarcken | |
| 6,381,640 B1 | 4/2002 | Beck et al. | |
| 6,389,454 B1 | 5/2002 | Ralston et al. | |
| 6,392,669 B1 | 5/2002 | Matoba et al. | |
| 6,397,191 B1 | 5/2002 | Notaini et al. | |
| 6,457,062 B1 | 9/2002 | Pivowar et al. | |
| 6,480,830 B1 | 11/2002 | Ford et al. | |
| 6,484,033 B2 | 11/2002 | Murray | |
| 6,496,568 B1 | 12/2002 | Nelson | |
| 6,529,136 B2 | 3/2003 | Cao et al. | |
| 6,549,939 B1 | 4/2003 | Ford et al. | |
| 6,560,456 B1 | 5/2003 | Lohtia et al. | |
| 6,574,605 B1 | 6/2003 | Sanders et al. | |
| 6,578,005 B1 | 6/2003 | Lesaint et al. | |
| 6,584,489 B1 | 6/2003 | Jones et al. | |
| 6,591,263 B1 | 7/2003 | Becker et al. | |
| 6,650,902 B1 | 11/2003 | Richton | |
| 6,741,969 B1 | 5/2004 | Chen et al. | |
| 6,801,763 B2 | 10/2004 | Eisey et al. | |
| 6,804,658 B2 | 10/2004 | Lim et al. | |
| 6,836,537 B1 | 12/2004 | Zimgibl et al. | |
| 6,837,427 B2 | 1/2005 | Overhultz et al. | |
| 6,845,370 B2 * | 1/2005 | Burkey et al. | 707/3 |
| 6,944,447 B2 | 9/2005 | Portman et al. | |
| 6,980,993 B2 | 12/2005 | Horvitz et al. | |
| 6,993,554 B2 * | 1/2006 | O'Donnell | 709/202 |
| 7,013,149 B2 | 3/2006 | Vetro et al. | |
| 7,031,998 B2 | 4/2006 | Archbold | |
| 7,035,811 B2 | 4/2006 | Gorenstein | |
| 7,072,886 B2 | 7/2006 | Salmenkaita et al. | |
| 7,080,021 B1 | 7/2006 | McCulloch | |
| 7,124,024 B1 | 10/2006 | Adelaide et al. | |
| 7,124,087 B1 | 10/2006 | Rodriguez et al. | |
| 7,124,089 B2 * | 10/2006 | Cornwell | 705/5 |
| 7,137,099 B2 | 11/2006 | Knight et al. | |
| 7,139,978 B2 | 11/2006 | Rojewski | |
| 7,162,254 B1 | 1/2007 | Smith | |
| 7,194,417 B1 | 3/2007 | Jones | |
| 7,280,823 B2 | 10/2007 | Ternullo et al. | |
| 7,283,970 B2 | 10/2007 | Cragun et al. | |
| 7,284,002 B2 | 10/2007 | Doss et al. | |
| 7,289,812 B1 | 10/2007 | Roberts et al. | |
| 7,296,017 B2 | 11/2007 | Larcheveque et al. | |
| 7,330,112 B1 | 2/2008 | Emigh et al. | |
| 7,340,403 B1 | 3/2008 | DeMarcken | |
| 7,353,182 B1 | 4/2008 | Missinhoun et al. | |
| 7,376,662 B2 | 5/2008 | Caparas et al. | |
| 7,376,735 B2 | 5/2008 | Straut et al. | |
| 7,394,900 B1 | 7/2008 | Gerber et al. | |
| 7,395,220 B2 * | 7/2008 | Abrams et al. | 705/6 |
| 7,395,231 B2 * | 7/2008 | Steury et al. | 705/34 |
| 7,409,643 B2 | 8/2008 | Daughtrey | |
| 7,426,537 B2 | 9/2008 | Lee et al. | |
| 7,428,302 B2 | 9/2008 | Zirngibl et al. | |
| 7,430,724 B2 | 9/2008 | Othmer | |
| 7,565,331 B2 | 7/2009 | Cutler et al. | |
| 7,672,881 B2 * | 3/2010 | Steury et al. | 705/34 |
| 2001/0021928 A1 | 9/2001 | Ludwig et al. | |
| 2001/0025314 A1 | 9/2001 | Matsumoto et al. | |
| 2001/0029425 A1 | 10/2001 | Myr | |
| 2001/0037243 A1 * | 11/2001 | Rouston et al. | 705/14 |
| 2002/0007327 A1 * | 1/2002 | Steury et al. | 705/34 |
| 2002/0010604 A1 | 1/2002 | Block | |
| 2002/0026336 A1 * | 2/2002 | Eizenburg et al. | 705/5 |
| 2002/0026356 A1 | 2/2002 | Bergh et al. | |
| 2002/0032591 A1 | 3/2002 | Mahaffy et al. | |
| 2002/0049644 A1 | 4/2002 | Kargman | |
| 2002/0065688 A1 | 5/2002 | Charlton et al. | |
| 2002/0072938 A1 | 6/2002 | Black et al. | |
| 2002/0077122 A1 | 6/2002 | Yule | |
| 2002/0095454 A1 | 7/2002 | Reed et al. | |
| 2002/0099613 A1 | 7/2002 | Swart et al. | |
| 2002/0115430 A1 | 8/2002 | Hall | |
| 2002/0116266 A1 | 8/2002 | Marshall | |
| 2002/0123280 A1 | 9/2002 | Saiz | |
| 2002/0143655 A1 | 10/2002 | Elston et al. | |
| 2002/0156659 A1 | 10/2002 | Walker et al. | |
| 2002/0156661 A1 * | 10/2002 | Jones et al. | 705/6 |
| 2002/0178034 A1 * | 11/2002 | Gardner et al. | 705/5 |
| 2002/0178226 A1 | 11/2002 | Anderson et al. | |
| 2002/0198747 A1 | 12/2002 | Boyer et al. | |
| 2003/0023499 A1 | 1/2003 | Das et al. | |
| 2003/0028390 A1 | 2/2003 | Stern et al. | |
| 2003/0033164 A1 | 2/2003 | Faltings | |
| 2003/0036928 A1 | 2/2003 | Kenigsberg et al. | |
| 2003/0040944 A1 | 2/2003 | Hileman | |
| 2003/0046118 A1 * | 3/2003 | O'Donnell | 705/5 |
| 2003/0046438 A1 * | 3/2003 | O'Donnell | 709/250 |
| 2003/0050964 A1 | 3/2003 | Debaty et al. | |
| 2003/0055690 A1 | 3/2003 | Garback | |
| 2003/0058842 A1 | 3/2003 | Bud | |
| 2003/0120530 A1 | 6/2003 | Casati et al. | |
| 2003/0126095 A1 | 7/2003 | Allen | |
| 2003/0140172 A1 | 7/2003 | Woods et al. | |
| 2003/0149781 A1 | 8/2003 | Yared et al. | |
| 2003/0177045 A1 | 9/2003 | Fitzgerald et al. | |
| 2003/0187705 A1 | 10/2003 | Schiff et al. | |
| 2003/0200146 A1 | 10/2003 | Levin et al. | |
| 2003/0208754 A1 | 11/2003 | Sridhar et al. | |
| 2003/0220835 A1 | 11/2003 | Barnes, Jr. | |
| 2003/0225600 A1 | 12/2003 | Slivka et al. | |
| 2003/0229900 A1 | 12/2003 | Reisman | |
| 2003/0233278 A1 | 12/2003 | Marshall | |
| 2003/0233365 A1 | 12/2003 | Schmit | |
| 2004/0002876 A1 | 1/2004 | Sommers et al. | |
| 2004/0019606 A1 | 1/2004 | Ackerman et al. | |
| 2004/0039613 A1 | 2/2004 | Maycotte et al. | |
| 2004/0064355 A1 | 4/2004 | Dorenbosch et al. | |
| 2004/0064445 A1 | 4/2004 | Pfeging et al. | |
| 2004/0064585 A1 | 4/2004 | Doss et al. | |
| 2004/0088107 A1 | 5/2004 | Seligmann | |
| 2004/0088392 A1 | 5/2004 | Barrett et al. | |
| 2004/0102979 A1 | 5/2004 | Robertson et al. | |
| 2004/0104977 A1 | 6/2004 | Obert | |
| 2004/0128196 A1 | 7/2004 | Shibuno | |
| 2004/0193432 A1 | 9/2004 | Khalidi | |
| 2004/0199411 A1 | 10/2004 | Bertram et al. | |
| 2004/0215517 A1 | 10/2004 | Chen et al. | |
| 2004/0220847 A1 | 11/2004 | Oguishi et al. | |
| 2004/0225540 A1 | 11/2004 | Waytena et al. | |
| 2004/0249568 A1 | 12/2004 | Endo et al. | |
| 2005/0010472 A1 | 1/2005 | Quatse et al. | |
| 2005/0043974 A1 | 2/2005 | Vassilev et al. | |
| 2005/0071245 A1 | 3/2005 | Norins et al. | |
| 2005/0091005 A1 | 4/2005 | Huard | |
| 2005/0125439 A1 | 6/2005 | Nourbakhsh et al. | |
| 2005/0138187 A1 | 6/2005 | Breiter et al. | |
| 2005/0187703 A1 | 8/2005 | Seligmann | |
| 2005/0209772 A1 | 9/2005 | Yoshikawa et al. | |
| 2005/0216301 A1 | 9/2005 | Brown | |
| 2005/0227712 A1 | 10/2005 | Estevez et al. | |
| 2005/0273373 A1 | 12/2005 | Walker et al. | |
| 2006/0004511 A1 | 1/2006 | Yoshikawa et al. | |
| 2006/0009987 A1 | 1/2006 | Wang | |
| 2006/0010206 A1 | 1/2006 | Apacible et al. | |
| 2006/0020565 A1 | 1/2006 | Rzevski et al. | |
| 2006/0041477 A1 | 2/2006 | Zheng | |
| 2006/0129438 A1 | 6/2006 | Robinson | |
| 2006/0206363 A1 | 9/2006 | Gove | |
| 2006/0206412 A1 | 9/2006 | Van Luchene et al. | |
| 2006/0220374 A1 | 10/2006 | Dorn et al. | |
| 2006/0235754 A1 | 10/2006 | Walker et al. | |
| 2006/0241983 A1 | 10/2006 | Viale et al. | |
| 2006/0247954 A1 | 11/2006 | Hunt | |
| 2007/0011034 A1 | 1/2007 | Jones et al. | |
| 2007/0016514 A1 | 1/2007 | Al-Abdulqader et al. | |
| 2007/0083327 A1 | 4/2007 | Brice et al. | |
| 2007/0123280 A1 | 5/2007 | McGary et al. | |
| 2007/0143153 A1 | 6/2007 | Ashby et al. | |

| | | |
|---|---|---|
| 2007/0162301 A1 | 7/2007 | Sussman et al. |
| 2007/0162328 A1 | 7/2007 | Reich |
| 2007/0208604 A1 | 9/2007 | Purohit et al. |
| 2007/0219832 A1* | 9/2007 | Willacy .............................. 705/5 |
| 2008/0046298 A1* | 2/2008 | Ben-Yehuda et al. ............ 705/6 |
| 2008/0052159 A1 | 2/2008 | DeLorme et al. |
| 2008/0103842 A1 | 5/2008 | Johnson |
| 2009/0101710 A1 | 4/2009 | Chakravarthy |
| 2009/0210261 A1 | 8/2009 | Mortimore, Jr. |
| 2009/0234564 A1 | 9/2009 | Onishi et al. |
| 2009/0248457 A1 | 10/2009 | Munter |

OTHER PUBLICATIONS

Of More people find ways to squeeze fun into work trips; For many business travelers, taking family or friends on a trip at relatively low cost has become a handy job perk, USA Today, Mclean, VA. May 20, 2003. p. E.12.*

More people find ways to squeeze fun into work trips; For many business travelers, taking family or friends on a trip at relatively low cost has become a handy job perk, USA Today, Mclean, VA. May 20, 2003. p. E.12.*

Reed, Dan, "More people find ways to squeeze fun into work trips; For many business travelers, taking family or friends on a trip at relatively low cost has become a handy job perk", USA Today, VA: May 20, 2003. p. E.12.*

Business/Technology/Travel Editors, "Biztravel.com adds innovative Features to its Superior Reservations System", Business Wire. New York: Apr. 21, 1998. p. 1.*

Sharkey, Joe, "Leisure activities are increasingly being fitted in to help make life on the road less of a grind", New York Times. (Late Edition (East Coast)). New York, N.Y.: Apr 18, 2001. p. C.6.*

Chapman, Ben, "Buyers add leisure value", Business Travel News. San Francisco: Jul. 29, 2002. vol. 19, Iss. 14; p. 4, 1 pgs.*

McFarlane, Isae Wada, "Adventures in Online Travel—Going somewhere? With the Internet as your travel agent, you can save yourself a lot of legwork and a carry-on full of cash", Computer Shopper, Apr. 2000, p. 188.*

Business Editors, High Tech & Travel Writers. ( May 16). COVENTUS Integrates ATG's Dynamo Product Suite Technology; COVENTUS Uses ATG Technology to Develop New Service Offering for the Online Business Traveler. Business Wire,1.*

Business Editors, "Restaurant Row Selects ServeClick from Connectria to Power its Advanced Online Restaurant E-scheduling," Business Wire, New York, Feb. 1, 2000.

Orbitz, LLC, search results of online search for flights at www.orbitz.com, Mar. 11, 2009.

Smith, Calvin et al., "The Talaris Services Business Language: A Case Study on Developing XML Vocabularies Using the Universal Business Language," School of Information Management & Systems, University of California, Sep. 2002, pp. 1-16.

* cited by examiner

SYSTEM AND METHOD FOR CHANGING A PERSONAL PROFILE OR CONTEXT DURING A TRANSACTION

BACKGROUND OF THE INVENTION

When a person makes a trip, for example, a business trip from San Francisco to New York, he may decide to take a side trip on personal business, such as, to continue the above example, a side trip from New York to Philadelphia to visit family, or perhaps a side trip to Boston to take in a baseball game. In most cases the traveler would find it advantageous to book this side trip as part of his business trip, and, depending on the company policies, he would then be required to reimburse the company for the costs incurred during the side trip (e.g., hotel and transportation). However, in some cases, the traveler may also prefer that the side trip is not visible to the company.

What is clearly needed is a system and method that allows a user to make one complex, multi-part booking or transaction in which some components may be purchased using one purchasing profile, and other components may be purchased using one or more different purchasing profiles.

SUMMARY

A method for changing a personal profile or context during a transaction, is described. In one embodiment, the method is to be implemented on a system. In one embodiment the method comprises receiving travel selections for a first leg of an itinerary; receiving an assignment of the travel selections for the first leg to a first profile; receiving travel selections for a second leg of the itinerary; receiving an assignment of the travel selections for the second leg to a second profile; and billing for the first and second legs of the itinerary as a single multi-leg travel itinerary, and billing the first leg of the itinerary to the first profile and billing the second leg of the itinerary to the second profile.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
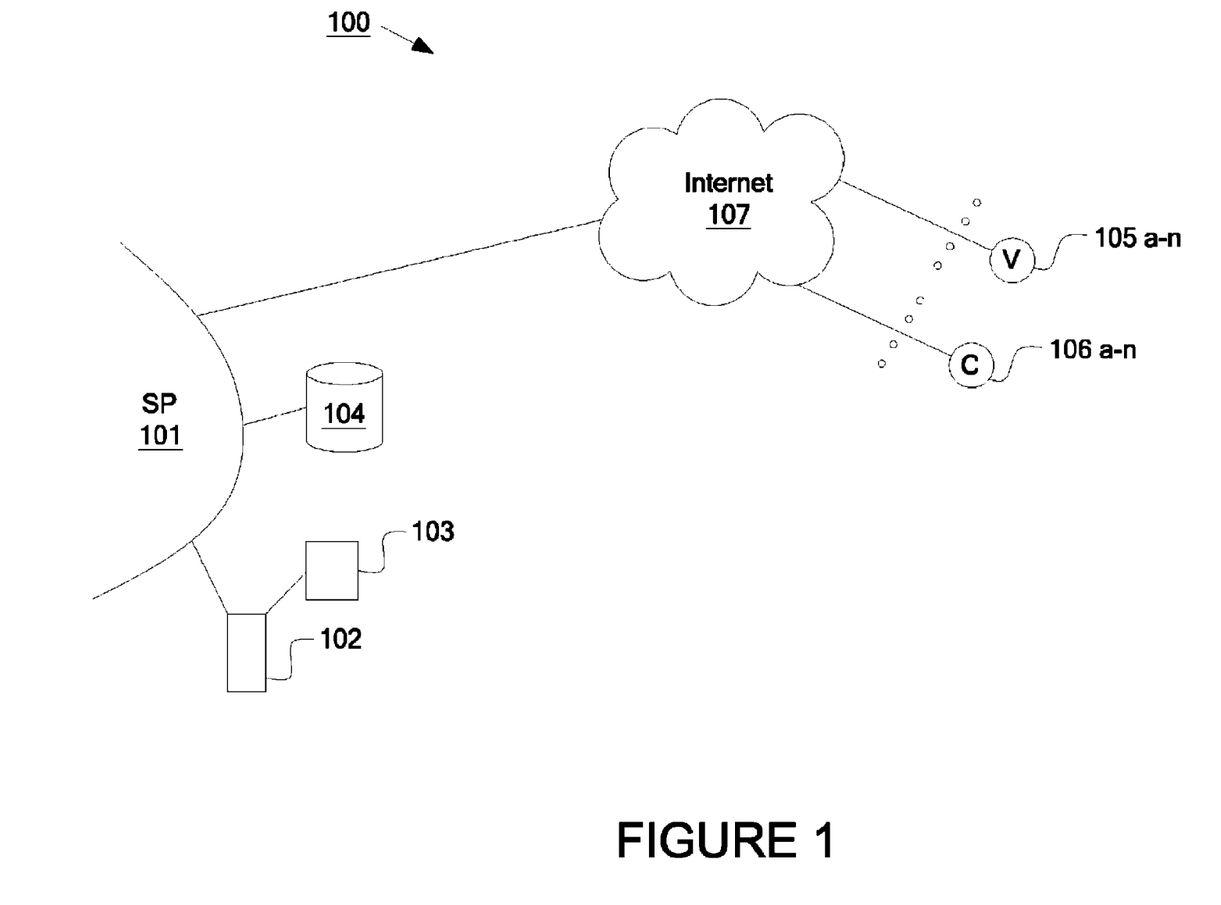
FIG. 1 shows an overview of an exemplary system in accordance with one embodiment.

FIG. 1 shows an overview of an exemplary system 100 in accordance with one embodiment. Electronic service portal 101 is running on server 102, which contains software instance 103. Portal 101 may be connected, typically, to Internet 107. Also connected typically through the Internet are vendors 105 a-n (also known as service providers) and customers 106 a-n. In some cases any or all of these connections may not be via the Internet, but rather through some dedicated or alternative means of connection, many varieties of which are known in the art. These various additionally possible well-known systems and methods of connection are not a main part of the novel art of this invention and, for purposes of clarity and simplicity, are not shown here.

Figure 2:
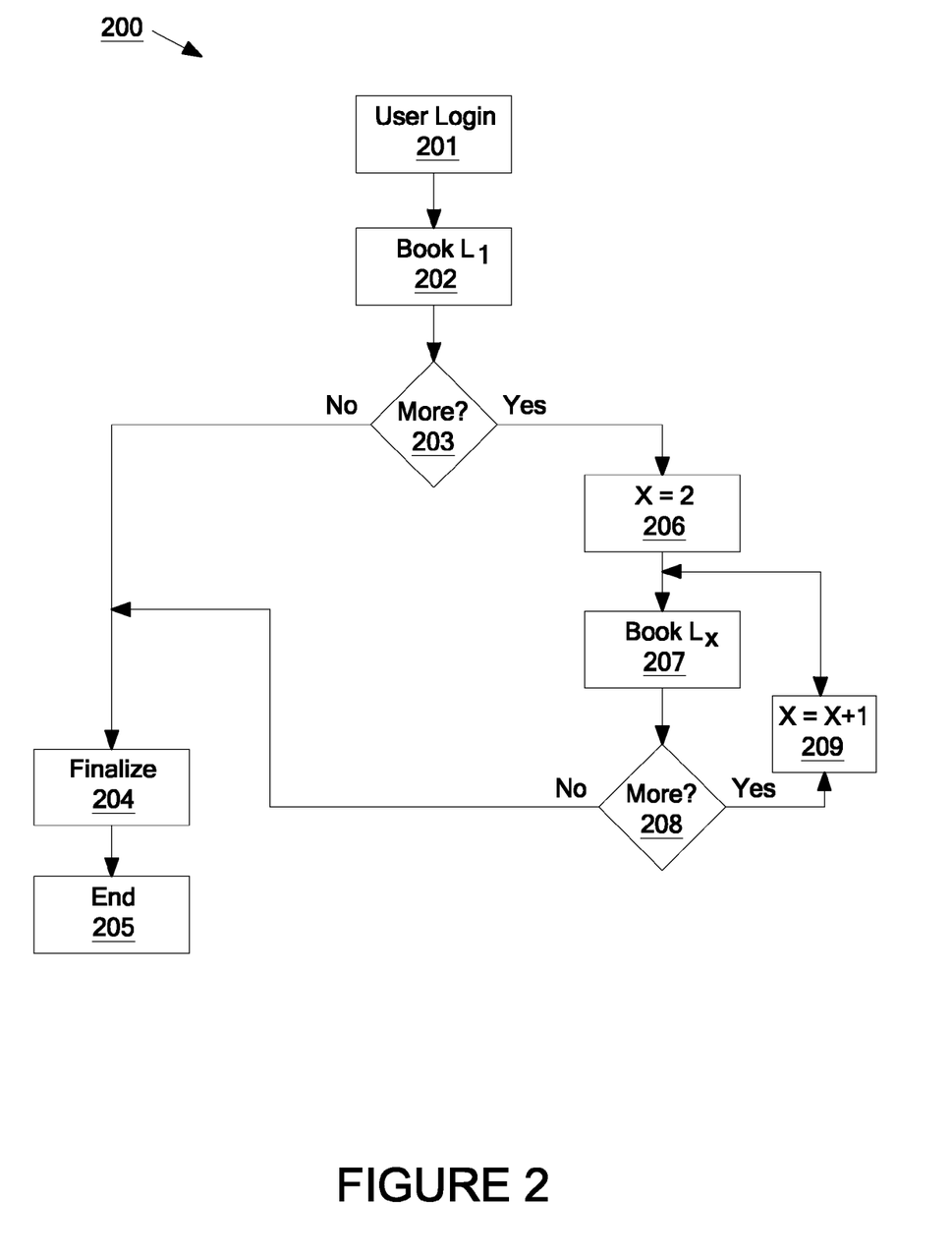
FIG. 2 shows the process flow of an exemplary system, in accordance with one embodiment, for booking multi-part transactions.

FIG. 2 shows the process flow 200 of an exemplary system, in accordance with one embodiment, for booking multi-part transactions. In process 201 a user logs in. He then books the first leg L1 of a transaction in process 202. In this example, the multi-part transaction may be for travel reservations, with multiple flights, hotel rooms, and rental cars. However, in other cases, the multi-part transactions may concern any of a great variety of services and products that are not necessarily limited to travel and transportation. In process 203, the process branches, depending on whether the user wishes to book more legs of the transaction.

If there are no more legs (no), the process moves to process 204, where the transaction is finalized (including payment terms, delivery if appropriate, corporate policy status and description, etc.), and then to process 205, where the process ends. If, however, the user wishes to book more legs of the transaction (yes), the process moves to process 206, where x is set at 2, so in process 207 the user may book leg Lx, where x=2, of the transaction.

The process then moves to process 208, where it again branches, with the same alternatives are process 203—that is, to finalize the transaction or to book more transaction legs. If the user again wishes to book more transactions (yes), the process moves to process 209, where x increments to x+1, and loops back to process 207, where the user again books leg Lx. This process continues until, in process 208, the user no longer wishes to book more legs of the transaction (no). The process then moves to process 204 and proceeds as described above.

Figure 3:
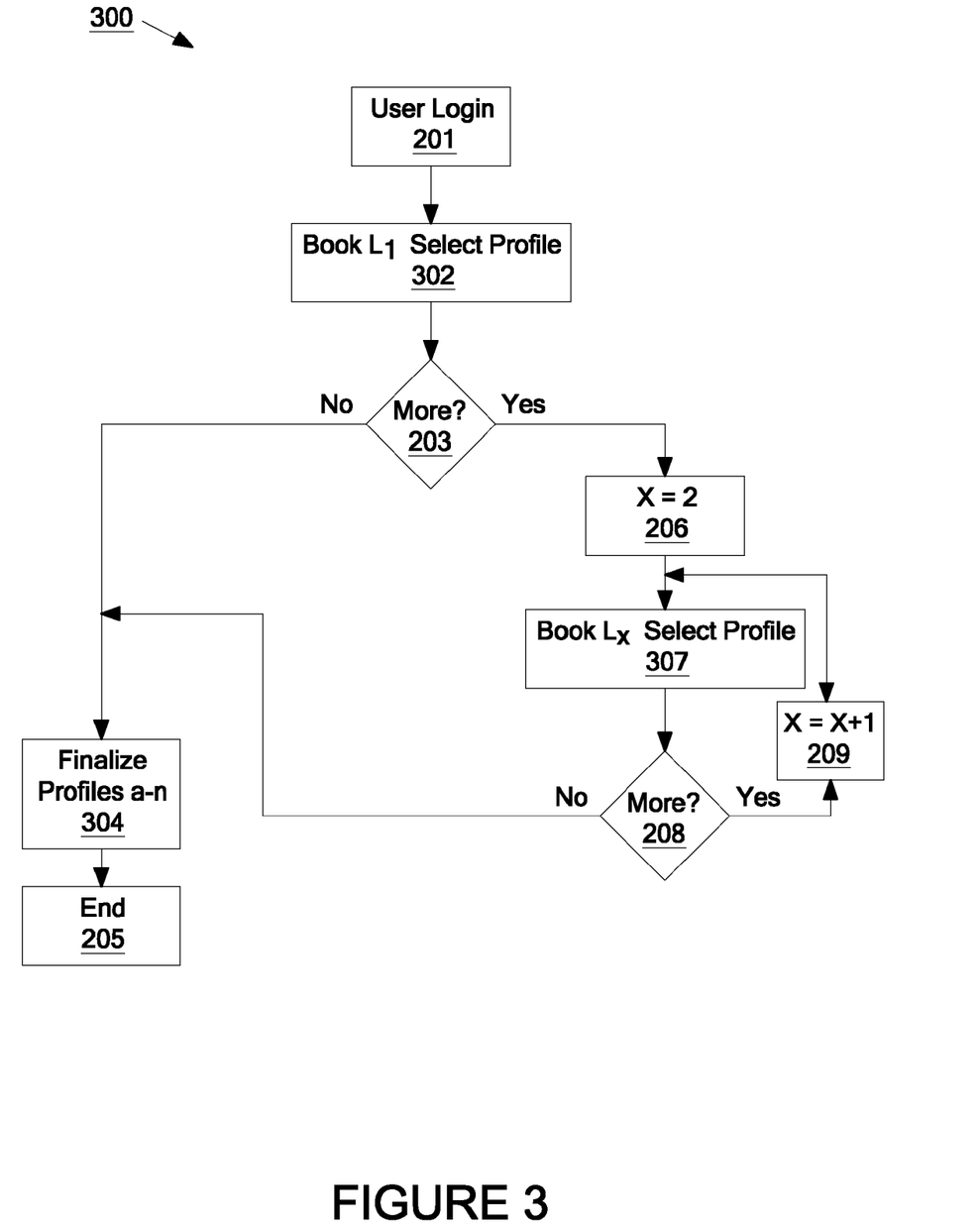
FIG. 3 shows the process flow of a system according to an exemplary embodiment, in which each user may have multiple profiles.

FIG. 3 shows the process flow of a system 300 according to an exemplary embodiment, in which each user may have multiple profiles. In process 201 a user logs in. He then books the first leg L1 of a transaction in process 302 and he also selects the preferred profile for this leg. In this example, again, the multi-part transaction may be for travel reservations, with multiple flights, hotel rooms, and rental cars. However, in other cases, the multi-part transactions may concern any of a great variety of services and products that are not necessarily limited to travel and transportation.

In process 203, the process branches, depending on whether the user wishes to book more legs of the transaction. If there are no more legs (no), the process moves to process 304, where the transaction is finalized (see below for a more detailed description of the processes of process 304), and then to process 205, where the process ends. If, however, the user wishes to book more legs of the transaction (yes), the process moves to process 206, where x is set at 2, so in process 307 the user may book leg Lx, where x=2, of the transaction. In process 307, when the user selects the next leg Lx of the transaction, he also selects the preferred profile for this leg.

The process then moves to process 208, where it again branches, with the same alternatives are process 203—that is, to finalize the transaction or to book more transaction legs. If the user again wishes to book more transactions (yes), the process moves to process 209, where x increments to x+1, and loops back to process 307, where the user again books leg Lx and selects the preferred profile. This process continues until, in process 208, the user no longer wishes to book more legs of the transaction (no). The process then moves to process 304. In process 304, when the user finalizes the entire transaction, he then finalizes the details for each leg of the transaction by choosing a profile 1-n to use for that part.

Each profile contains information about payment mechanism, corporate policy applicability and terms, service preferences such as preferred rental car type (midsize, etc), loyalty program information (e.g. United frequent flyer program number), type of fare to book (first class, coach class unrestricted, etc) and other information. However, the entire transaction is booked as a whole, thus accruing to the user the savings of one multi-leg flight, for example, and the convenience of one set of reservations.

Figure 4:
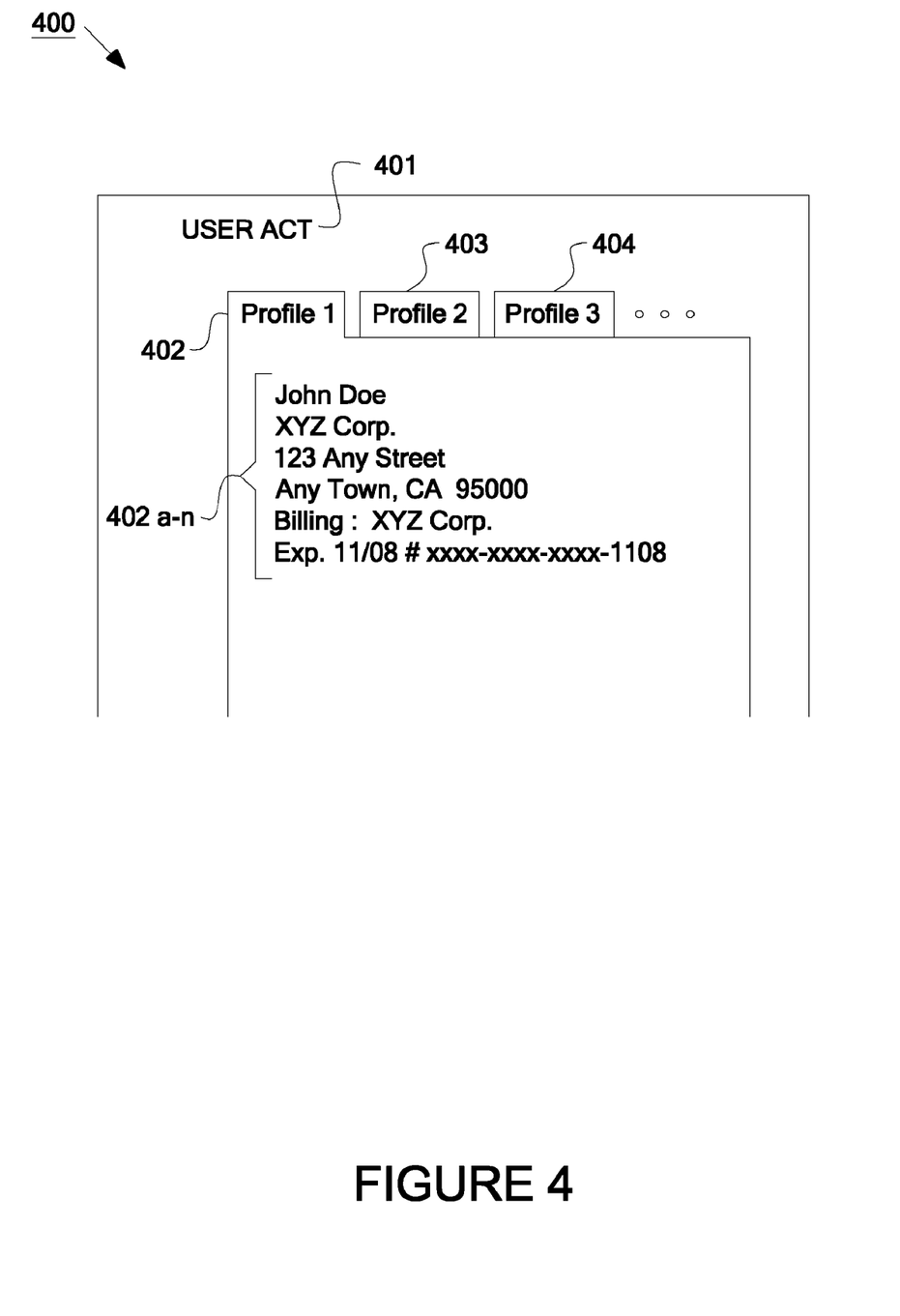
FIG. 4 shows an overview of an exemplary embodiment of a system for organizing user accounts.

FIG. 4 shows an overview of an exemplary embodiment of a system 400 for organizing user accounts. User account 401 may have multiple profiles, such as Profile 1 402, Profile 2 403, Profile 3 404, etc. Each profile contains a set of profile-specific data such as, for example, profile data 402 a-n. Typically, all profiles may pertain to the same person, in this example user John Doe, but other profile details may differ, such as the organization, in this example XYZ Corp., the address, the billing details, etc. For example, one profile may be the corporate account of the user; another profile may be the personal American Express account, while a third profile may his AAA account, and so on.

It is clear that many modifications and variations of this invention may be made by one skilled in the art without departing from the spirit of the novel art of this disclosure. For example, a user may wish to include in his profiles a credit card for his college-age child, in which case the person in the profile would be, for example, Susan Doe, while the credit card and address details would be the same.

At least some embodiments, and the different structure and functional elements described herein, can be implemented using hardware, firmware, programs of instruction, or combinations of hardware, firmware, and programs of instructions.

In general, routines executed to implement the embodiments can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects.

While some embodiments have been described in the context of fully functioning computers and computer systems, those skilled in the art will appreciate that various embodiments are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions can be embodied in digital and analog communication links for electrical, optical, acoustical or other forms of propagated signals, such as carrier waves, infrared signals, digital signals, etc.

A machine readable medium can be used to store software and data which when executed by a data processing system causes the system to perform various methods. The executable software and data can be stored in various places including for example ROM, volatile RAM, non-volatile memory and/or cache. Portions of this software and/or data can be stored in, any one of these storage devices.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Some aspects can be embodied, at least in part, in software. That is, the techniques can be carried out in a computer system or other data processing system in response to its processor, such as a microprocessor, executing sequences of instructions contained in a memory, such as ROM, volatile RAM, non-volatile memory, cache, magnetic and optical disks, or a remote storage device. Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), or firmware such as electrically erasable programmable read-only memory (EEPROM's).

In various embodiments, hardwired circuitry can be used in combination with software instructions to implement the embodiments. Thus, the techniques are not limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations in a particular order, operations which are not order dependent can be reordered and other operations can be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications can be made thereto without departing from the broader spirit and scope of the invention as set forth in the following claims. The specification and drawings are, accordingly, to be regarded in an illustrative sense rather than a restrictive sense.

What is claimed is:

1. A computer implemented method comprising:
    receiving, via a computing device, over a network, travel selections for a first leg of an itinerary;
    receiving, over the network, an assignment of the travel selections for the first leg to a first profile stored on a computer readable medium corresponding to professional data of a first user;

after receiving the assignment of the travel selections for the first leg to the first profile corresponding to the professional data of the first user, receiving travel selections for a second leg of the itinerary, via the computing device, over the network;

receiving, over the network, an assignment of the travel selections for the second leg to a second profile stored on the computer readable medium different from the first profile, the second profile corresponding to personal data of the first user, the personal data different from the professional data; and billing, using the computing device, for the first and second legs of the itinerary as a single multi-leg travel itinerary, and billing the first leg of the itinerary to the first profile and billing the second leg of the itinerary to the second profile;

wherein the first profile includes data about a corporate policy of an employer of the first user, and the second profile includes data about a family member of the first user; and wherein the first and second profiles each include profile information including unique credit card account information, predetermined service preferences, loyalty program information, and a predetermined level of fare to be booked.

2. The method of claim 1, further comprising:
receiving, via the computing device, over the network, travel selections for a third leg of the itinerary;
receiving, over the network, an assignment of the travel selections for the third leg to the first profile; and billing, using the computing device, for the first, second, and third legs of the itinerary as a single multi-leg travel itinerary, and billing the first and third legs of the itinerary to the first profile and billing the second leg of the itinerary to the second profile; and billing, using the computing device, for the first, second, and third legs of the itinerary as a single multi-leg travel itinerary, and billing the first and third legs of the itinerary to the first profile and billing the second leg of the itinerary to the second profile.

3. The method of claim 1, wherein the first and second legs of the itinerary include one or more of a flight reservation, a hotel reservation, and a vehicle rental reservation.

4. The method of claim 1, wherein the predetermined level of fare to be booked includes a level of fare selected from a group comprising two or more of first class, business class, coach class, economy class, and unrestricted.

5. The method of claim 4, wherein the first profile and the second profile are selected sequentially.

6. The method of claim 5, wherein payment information of the first profile corresponds to an organization separate from the first user, and payment information of the second profile corresponds to the first user.

7. A non-transitory tangible machine readable medium having stored thereon a set of instructions which when executed by a computing device, cause the computing device to perform a method comprising: receiving, via the computing device, over a network, travel selections for a first leg of an itinerary;
receiving, over the network, an assignment of the travel selections for the first leg to a first profile stored on a computer readable medium corresponding to professional data about a first user;
after receiving the assignment of the travel selections for the first leg to the first profile corresponding to the professional data of the first user, receiving travel selections for a second leg of the itinerary, via the computing device, over the network;
receiving, over the network, an assignment of the travel selections for the second leg to a second profile stored on the computer readable medium different from the first profile, the second profile corresponding to personal data of the first user, the personal data different from the professional data; and
billing, using the computing device, for the first and second legs of the itinerary as a single multi-leg travel itinerary, and billing the first leg of the itinerary to the first profile and billing the second leg of the itinerary to the second profile;
wherein the first profile includes data about a corporate policy of an employer of the first user, and the second profile includes data about a family member of the first user; and
wherein the first and second profiles each include profile information including unique credit card account information, predetermined service preferences, loyalty program information, and a predetermined level of fare to be booked.

8. The machine readable medium of claim 7, further comprising: receiving, via the computing device, over the network, travel selections for a third leg of the itinerary;
receiving, over the network, an assignment of the travel selections for the third leg to the first profile; and billing, using the computing device, for the first, second, and third legs of the itinerary as a single multi-leg travel itinerary, and billing the first and third legs of the itinerary to the first profile and billing the second leg of the itinerary to the second profile.

9. The machine readable medium of claim 7, wherein the first and second legs of the itinerary include one or more of a flight reservation, a hotel reservation, and a vehicle rental reservation.

10. The machine readable medium of claim 7, wherein the predetermined level of fare to be booked includes a level of fare selected from a group comprising two or more of first class, business class, coach class, economy class, and unrestricted.

11. The machine readable medium of claim 10, wherein the first profile and the second profile are selected sequentially.

12. The machine readable medium of claim 11, wherein payment information of the first profile corresponds to an organization separate from the first user, and payment information of the second profile corresponds to the first user.

13. A computer system comprising:
means for receiving, over a network, travel selections for a first leg of an itinerary, and for receiving travel selections for a second leg of the itinerary;
means for receiving, over the network, an assignment of the travel selections for the first leg to a first profile stored on a computer readable medium corresponding to professional data of a first user and an assignment of the travel selections for the second leg to a second profile stored on the computer readable medium different from the first profile, the second profile corresponding to personal data of the first user, the personal data different from the professional data; and
means for billing for the first and second legs of the itinerary as a single multi-leg travel itinerary, and billing the first leg of the itinerary to the first profile and billing the second leg of the itinerary to the second profile;
wherein the first profile includes data about a corporate policy of an employer of the first user, and the second profile includes data about a family member of the first user, and wherein the travel selections for the second leg of the itinerary are received after the assignment of the travel selections for the first leg to the first profile is received; and wherein the first and second profiles each include profile information including unique credit card account information, predetermined service preferences, loyalty program information, and a predetermined level of fare to be booked.

14. The system of claim 13, wherein:

the means for receiving the travel selections further includes means for receiving travel selections for a third leg of an itinerary over the network;

the means for receiving the assignments further includes means for receiving an assignment of the travel selections for the third leg to the first profile over the network; and the means for billing further includes means for billing for the first, second, and third legs of the itinerary as a single multi-leg travel itinerary, and means for billing the first and third legs of the itinerary to the first profile and billing the second leg of the itinerary to the second profile.

15. The system of claim 13, wherein payment information of the first profile corresponds to an organization separate from the first user, and payment information of the second profile corresponds to the first user.

\* \* \* \* \*